H. F. BARTLETT.
Evaporating Pan.

No. 44,698.

Patented Oct. 18, 1864.

Witnesses:

Inventor:

UNITED STATES PATENT OFFICE.

H. F. BARTLETT, OF LA GRANGE, MISSOURI.

IMPROVED EVAPORATING-PAN FOR SUGAR.

Specification forming part of Letters Patent No. 44,698, dated October 18, 1864.

*To all whom it may concern:*

Be it known that I, H. F. BARTLETT, of La Grange, in the county of Lewis and State of Missouri, have invented a new and Improved Sugar-Pan; and I do hereby declare that the following is a full, clear, and exact description thereof, which will enable those skilled in the art to make and use the same, reference being had to the accompanying drawings, forming part of this specification, in which—

Figure 1:
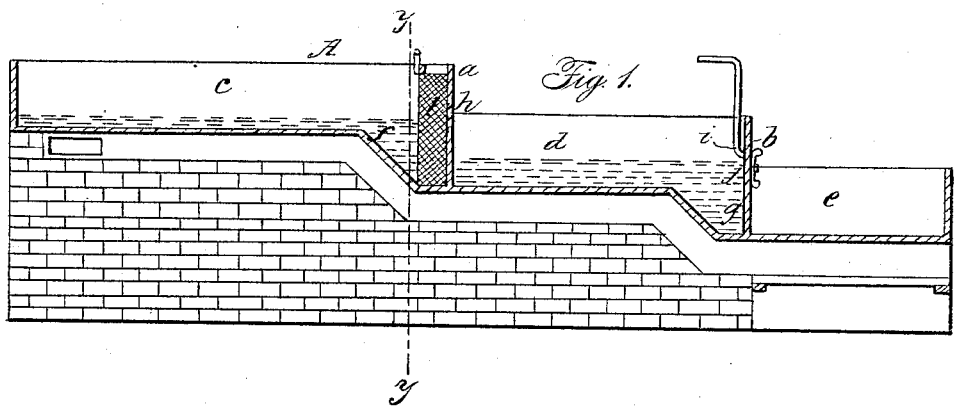
Figure 3:
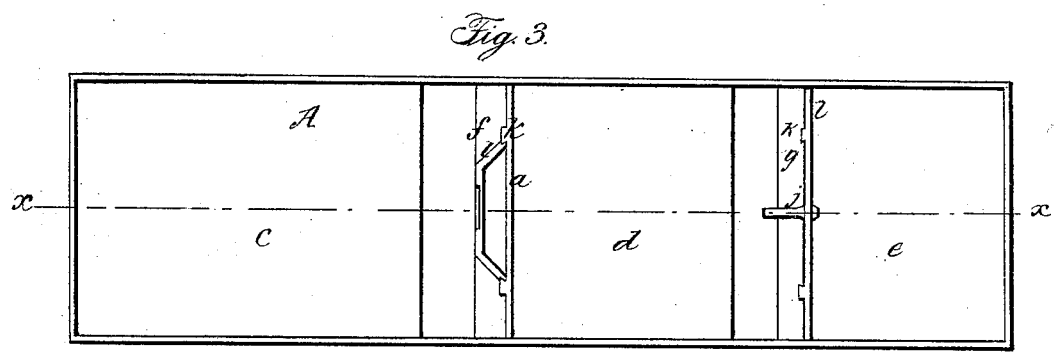
Figure 2:
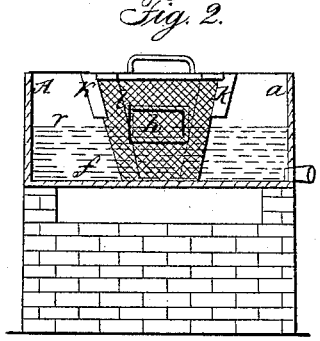

Figure 1 represents a longitudinal vertical section of this invention, the line $x$ $x$, Fig. 3, indicating the plane of section. Fig. 2 is a transverse vertical section of the same, taken in the plane indicated by the line $y$ $y$, Fig. 1. Fig. 3 is a plan or top view of the same.

Similar letters of reference indicate corresponding parts.

This invention relates to certain improvements in that class of sugar-pans in which the three compartments of the pan are separated one from the other by transverse partitions, and placed at different levels, so that the juice from the first compartment runs down to the second, and from the second to the third or finishing pan. Each of the two first pans is provided with a deep gutter or depression close in front of the partition separating said compartment or pan from the next succeeding one, and the opening or gates leading from one pan to the next are placed at such a height above the bottoms of said gutters that by opening the gates the sediment is retained and the clear juice or sirup is allowed to pass from one pan to the other. In order to retain the scum, each gate-opening is furnished with a movable box-strainer, which can be readily inserted before the gate is thrown open.

A represents a sugar-pan, which is divided by transverse partitions $a$ $b$ in three compartments, $c$ $d$ $e$. Each of these compartments forms a separate pan, and, if desired, each pan might be made separate and connected to the adjoining pan or pans in any suitable manner. The first pan, $c$, is placed higher than the second, and the second higher than the third, as clearly shown in Fig. 1 of the drawings, so that the juice, after having been heated in the first pan, can be easily let down in the second, and thence in the third or finishing pan.

Close in front of the partition $a$, which divides the pan $c$ from the pan $d$, is a deep gutter, $f$, the lowest portion or bottom of which is on a level with the bottom of the second pan, $d$, and a similar gutter, $g$, is close in front of the partition $b$. This second gutter extends down to a level with the bottom of the finishing-pan. The pan $c$ communicates with the pan $d$ through an opening, $h$, which is situated somewhat above the level of the bottom of the first pan, and consequently higher than the bottom of the gutter $f$, immediately in front of the partition $a$. By placing the gate-opening at a certain height above the bottom of the gutter, the heavy impurities contained in the juice which do not rise with the scum have a chance to settle in the gutter, and the clear juice can be let down into the second pan, and by placing said gate-opening above the level of the bottom of the pan the danger of drawing dry and burning is prevented. The gate-opening $i$, which forms the communication between the second and the finishing pan is similarly situated to the opening $h$, so that all impurities contained in the juice are retained in the first two pans, and nothing but the clear juice is allowed to pass in the finishing-pan. The gate-openings $h$ $i$ are closed by plates $j$, which are provided with clamp-screws, and so arranged that they are to be fastened on the outer sides of the partitions. The inner sides, or that side of the partition $a$ facing the pan $c$ and that side of the partition $b$ facing the pan $d$, are provided with grooved flanges $k$, to receive and hold the strainers $l$. These strainers are made of perforated sheet metal or any other suitable material, with three sides—one to face the partition, to which it is secured, and the others, which are in an angular position toward the first side, to catch in the V-shaped grooves formed between the edges of the flanges and the surfaces of the partitions. By this arrangement access can be had to the plates $j$ from both sides, whether the strainers are in position or not, and, after said strainers have been adjusted in position, the plates can be readily unfastened, so as to open the communication between the several pans. If the strainers have thus been adjusted before the plates $j$ have been removed, all the juice contained in one compartment or pan is compelled to pass through one of the strainers in order to reach the next compartment or pan, and the scum which rises in one pan has no chance to escape to the next. When the openings $h\ i$ are closed, the strainers can be removed and cleaned. By the use of this pan the operation of boiling cane-juice can be carried on without interruption and without danger of scorching or burning, and the sirup produced is clear and free from all impurities.

I claim as new and desire to secure by Letters Patent—

The box-shaped strainers $l$, plates $i$, and openings $k$, arranged in combination with the pans $c\ d\ e$ and gutters $f\ g$, in the manner and for the purpose substantially as specified.

H. F. BARTLETT.

Witnesses:
SIMEON CONNELLY,
WM. J. BOHON.